United States Patent
Turnquist et al.

(10) Patent No.: US 6,367,806 B1
(45) Date of Patent: Apr. 9, 2002

(54) SEAL ARRANGEMENT FOR A ROTARY MACHINE SUCH AS A TURBINE

(75) Inventors: Norman Arnold Turnquist, Carlisle; Osman Saim Dinc, Troy; George Ernest Reluzco, Schenectady; Robert Harold Cromer, Johnstown; Martin Francis O'Connor, Niskayuna; David Robert Skinner, Pattersonville; Christopher Edward Wolfe, Niskayuna, all of NY (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 09/472,914

(22) Filed: Dec. 27, 1999

(51) Int. Cl.[7] .................................. F16J 15/44
(52) U.S. Cl. ........................ 277/355; 277/416
(58) Field of Search ................. 277/355, 416; 415/173.5, 174.5, 230

(56) References Cited

U.S. PATENT DOCUMENTS 5,106,104 A * 4/1992 Atkinson et al. ............ 277/355
5,108,116 A * 4/1992 Johnson et al. ............. 277/355
5,749,584 A 5/1998 Skinner et al.
5,971,400 A * 10/1999 Turnquist et al. ........... 277/416
6,030,175 A * 2/2000 Bagepalli et al. ......... 415/173.5

FOREIGN PATENT DOCUMENTS

| EP | 0945654 | 9/1999 |
| GB | 2198195 | 6/1988 |
| GB | 2301635 | 12/1996 |

* cited by examiner

Primary Examiner—Robert J. Sandy
Assistant Examiner—Karlena D. Schwing
(74) Attorney, Agent, or Firm—Donald S. Ingraham; Christian G. Cabou

(57) ABSTRACT

A seal arrangement for a rotary machine, such as a turbine, includes a main seal segment such as a labyrinth seal segment, a brush seal segment disposed in a slot in the main seal segment and having a layer of bristles secured between upstream and downstream plates of the brush seal segment, and at least one passage radially formed through the main seal segment to communicate a balancing pressure from a pressure source located exteriorly of an outer periphery of the main seal segment to a cavity defined in the downstream plate of the brush seal segment at a downstream side of the layer of bristles of the brush seal segment.

16 Claims, 2 Drawing Sheets

SEAL ARRANGEMENT FOR A ROTARY MACHINE SUCH AS A TURBINE

BACKGROUND OF THE INVENTION

The present invention generally relates to rotary machines, such as steam and gas turbines, and, more particularly, is concerned with a seal arrangement for a rotary machine such as a turbine.

Rotary machines, such as steam and gas turbines, used for power generation and mechanical drive applications are generally large machines having multiple turbine stages. In turbines, high pressure fluid flowing through the turbine stages must pass through a series of stationary and rotary components, and seals typically are used between the stationary and rotating components to minimize leakage of the fluid. The efficiency of the turbine is dependent on the ability of the seals to prevent fluid leakage.

Traditionally, one type of seal that is used to control fluid leakage in turbines is a labyrinth seal which has sharp rigid teeth. While the labyrinth seal has proven to be quite reliable, its performance degrades over time. This occurs as a result of transient events in which the stationary and rotating components move radially relative to and thus interfere with one another causing rubbing on the teeth of the labyrinth seal so as to enlarge the clearance between the stationary and rotating components and allow increase of leakage.

Another type of seal that is used in combination with the labyrinth seal to improve leakage control is a brush seal. The brush seal is generally less prone to leakage than the labyrinth seal because the brush seal has seal bristles that can flex and thus better accommodate the relative radial movement between the stationary and rotating components. The brush seal also generally conforms better to surface non-uniformities than does the labyrinth seal. Such combination brush and labyrinth seal arrangements are disclosed in U.S. Pat. No. 5,749,584 to Skinner et al. assigned to General Electric Company, the assignee of the present invention, and U.K. Pat. Application No. 2,301,635 to Hemsley et al assigned to GEC Alsthom Limited.

In one prior art high pressure differential brush seal design shown in FIG. 1, the brush seal 10 includes a layer of bristles 12 disposed or sandwiched between an upstream plate 14 and a downstream plate 16. The downstream plate 16 is a backing plate provided to prevent deflection of the bristles 12 under the loading from an upstream direction of the flow while an inner portion 12a of the layer of bristles 12 project beyond the inner edge 16a of the downstream plate 16 so as to engage the rotor R of the turbine. In order to achieve higher pressure differentials, a pressure balance design is required to relieve the net force holding the layer of bristles 12 against the downstream plate 16. The one prior art design also includes a seal holder 18 capturing the brush seal 10 and incorporating passageways 20 for directing high pressure steam to a downstream side of the layer of bristles 12 in order to pressurize a cavity 22 present between the layer of bristles 12 and the downstream plate 16.

A problem, however, exists with such a high pressure brush seal design. The brush seal 10 is bulky in size and thus difficult to retrofit into existing steam turbines where space is limited. Thus, a need exists for an innovation which will provide an effective solution to the aforementioned problem without introducing any new problems in place thereof

BRIEF SUMMARY OF THE INVENTION

The present invention provides a seal arrangement for a rotary machine, such as a turbine, which incorporates a pressure balanced brush seal in a manner designed to satisfy the aforementioned need. In the present invention, the pressure balance element is a radial passage formed through the main seal segment (such as a labyrinth seal segment) which eliminates the need for the brush seal holder of the prior art design. As a result, the overall size of the brush seal is reduced and a more compact brush seal is achieved, permitting the installation of the brush seal in applications where space is limited.

In one embodiment of the present invention, a seal arrangement for a turbine is provided having a main seal segment and a brush seal segment. The main seal segment has an outer periphery, an inner periphery disposed radially inwardly from the outer periphery and a slot defined in the main seal segment between the outer and inner peripheries thereof and being open at the inner periphery and extending toward and terminating in a spaced relationship from the outer periphery. The brush seal segment is disposed in the slot and includes a layer of bristles having opposite outer and inner portions and upstream and downstream sides, an upstream plate having outer and inner portions and being disposed at the upstream side of the layer of bristles and a downstream plate having outer and inner portions and being disposed at the downstream side of the layer of bristles. The outer portion of the layer of bristles is secured between the outer portions of the upstream and downstream plates and the inner portion of the layer of bristles extends beyond the inner portions of the upstream and downstream plates. The downstream plate also has opposite ends, opposite sides respectively facing toward and away from the downstream side of the layer of bristles, and a cavity recessed in the one side thereof facing toward the downstream side of the layer of bristles. The cavity extends between and is terminated by the opposite ends of the downstream plate.

The seal arrangement further includes means for communicating pressure through the main seal segment to the cavity in the downstream plate of the brush seal segment from a source of pressure located exteriorly of the outer periphery of the main seal segment for providing a balance of pressure between the pressure source and the cavity of the downstream plate of the brush seal segment and thereby at the downstream side of the layer of bristles. The means for communicating pressure includes at least one elongated passage formed radially through the main seal segment between the outer periphery and the slot thereof and at least one hole formed through the downstream plate of the brush seal segment between the opposite sides of the downstream plate and communicating with the passage and opening into the cavity in the downstream plate. The hole is formed closer to the outer portion than to the inner portion of the downstream plate.

The main seal segment is arcuate-shaped for placing it end-to-end with other like main seal segments for extending about a turbine rotor. The brush seal segment is arcuate-shaped for placing it end-to-end with other like brush seal segments so as to conform to the arcuate-shaped main seal segment.

DETAILED DESCRIPTION OF THE INVENTION

The present invention is a seal arrangement for a rotary machine. Rotary machines include, without limitation, centrifugal compressors, generators, and turbines. Turbines include, without limitation, steam turbines and gas turbines. Turbines have, without limitation, compressor sections and turbine sections. Although the invention is hereinafter described in terms of a seal arrangement for a turbine, it is understood that the invention is not so limited and applies to a seal arrangement for any rotary machine as will be appreciated by those skilled in the art. It is noted that FIG. 2 shows only a portion of a rotary machine, such portion including a housing and a rotor of a turbine.

Figure 1:
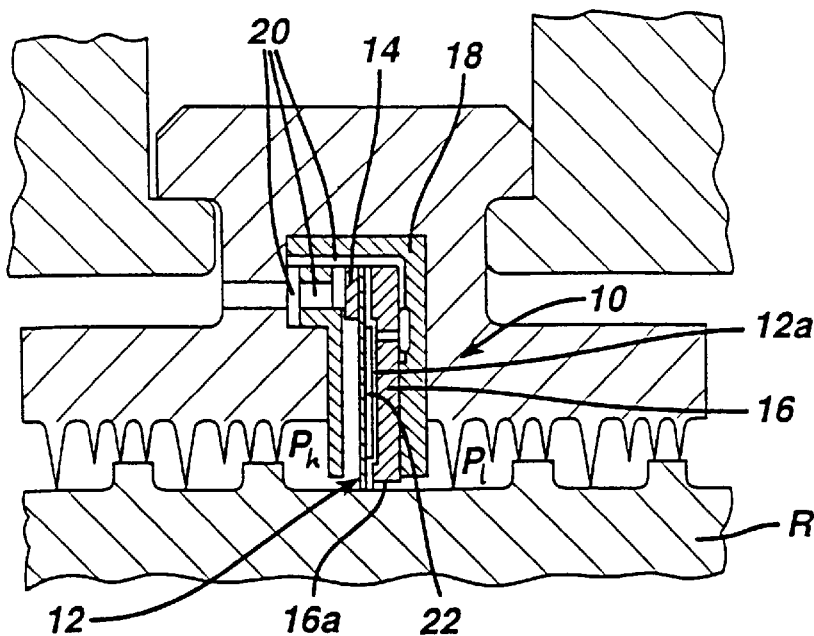
FIG. 1 is a cross-sectional view of a prior art labyrinth seal and brush seal arrangement wherein the brush seal has a layer of bristles captured in a seal holder.
Figure 2:
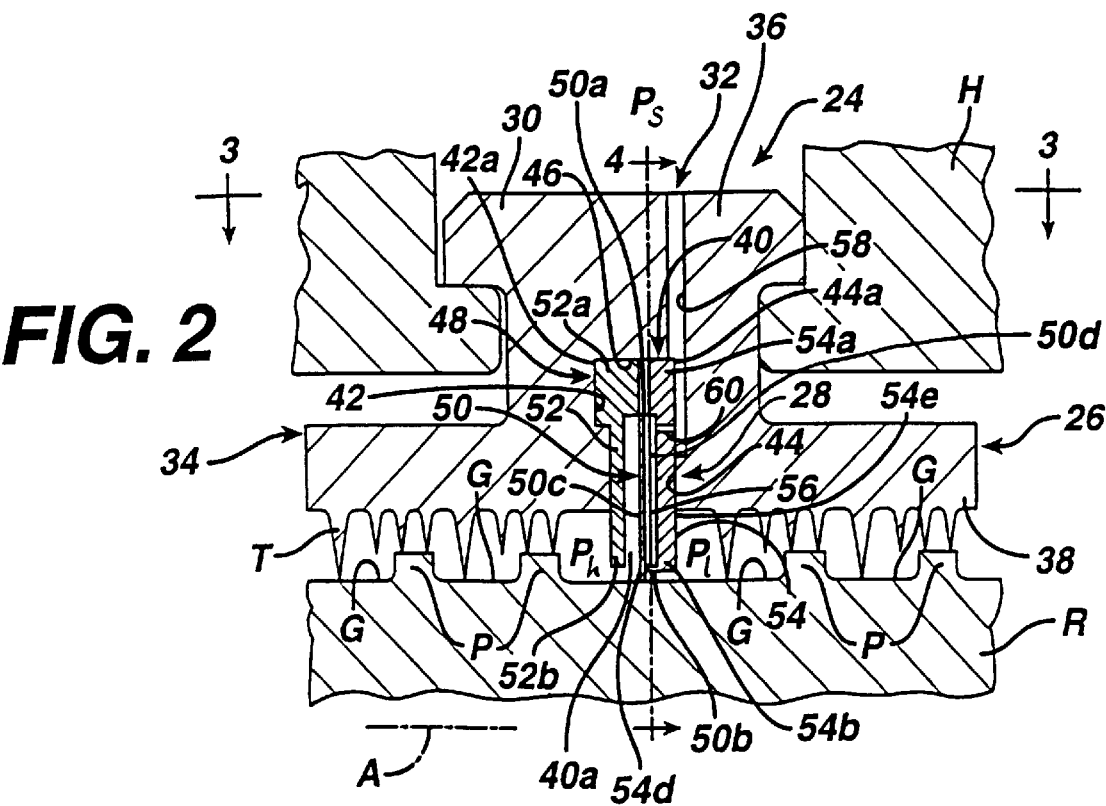
FIG. 2 is a cross-sectional view of a seal arrangement of the present invention.
Figure 3:
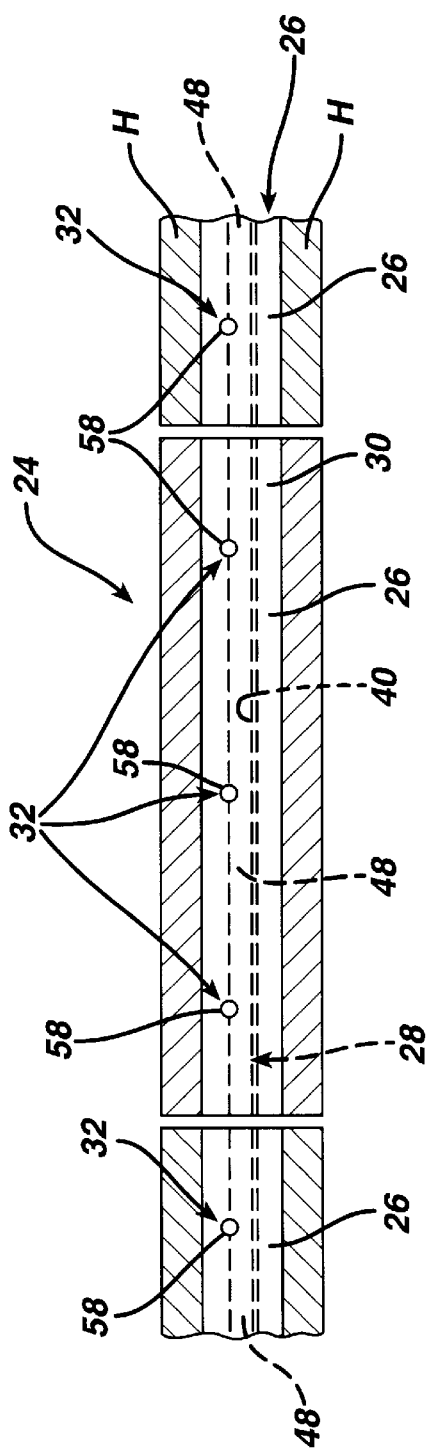
FIG. 3 is a top plan view of the seal arrangement as seen along line 3—3 of FIG. 2.
Figure 4:
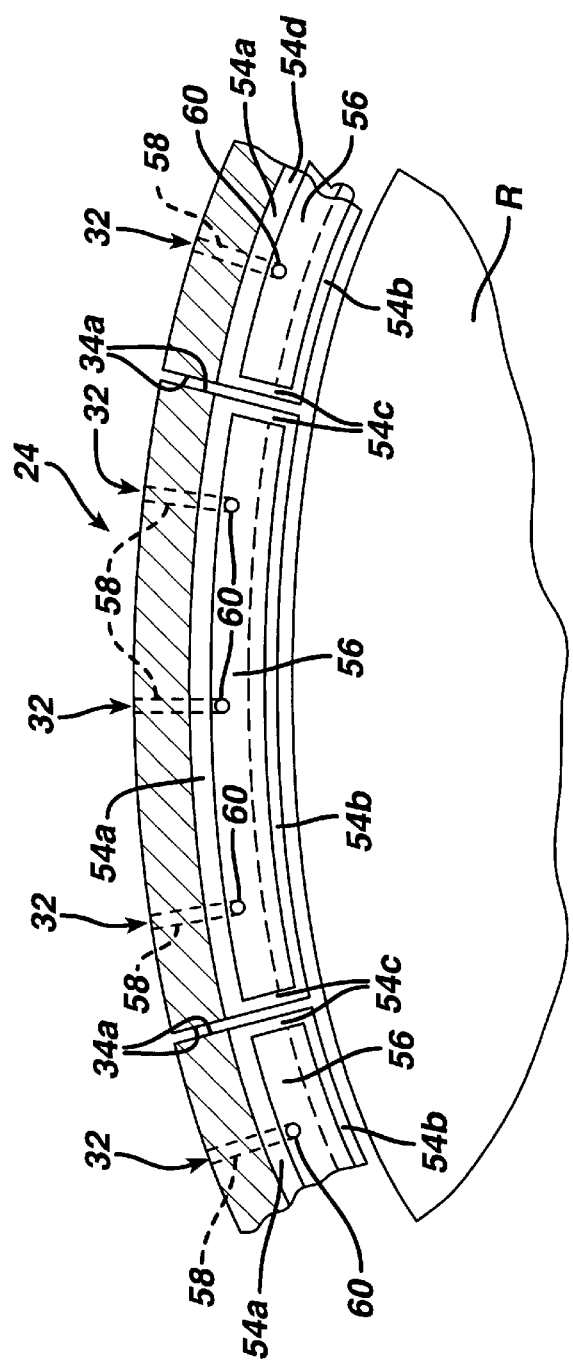
FIG. 4 is a longitudinal sectional view of the seal arrangement taken along line 4—4 of FIG. 2.

Referring now to FIGS. 2 to 4 of the drawings, there is illustrated a seal arrangement of the present invention, generally designated 24, provided between a turbine housing H and a turbine shaft or rotor R. The seal arrangement 24 includes an annular main seal 26, such as a labyrinth seal, and an annular brush seal 28. The labyrinth seal 26 has a seal ring 30 disposed about the rotor R separating high and low pressure regions $P_h$, $P_l$, on axially opposite sides of the seal ring 30. It will be appreciated that while only one seal ring 30 is disclosed, typically multiple-stage labyrinth seals are provided about the rotor R. The seal arrangement 24 also has pressure communicating means 32 formed through the seal ring 30 of the labyrinth seal 26 to the annular brush seal 28 for balancing pressure between the annular brush seal 26 and a pressure source $P_s$ located exteriorly of the seal ring 30. The annular labyrinth seal 26 is mounted in the turbine housing H and extends about the rotor R which is supported by conventional means, not shown, within the turbine housing H.

Each seal ring 30 of the labyrinth seal 26 is formed of an annular array of a plurality of like arcuate-shaped main seal segments 34 placed end-to-end in the housing H extending about the rotor R and have a plurality of radially projecting, axially spaced teeth T. The teeth T are of a hi-lo design for obtaining close clearances with radial projections or ribs P and grooves G on the rotor R. The labyrinth seal 26 functions by placing a relatively large number of barriers, i.e., the teeth T, to the flow of fluid from the high pressure region $P_h$ to the low pressure region $P_l$ on opposite sides of the brush seal 28, with each barrier forcing the fluid to follow a tortuous path.

More particularly, each main seal segment 34 has an outer periphery 36 facing away from the rotor R, an inner periphery 38 spaced radially inwardly from the outer periphery 36 and facing toward the rotor R, and a slot 40 defined in the main seal segment 34 between the outer and inner peripheries 36, 38 and being open at the inner periphery 38 adjacent to the rotor R. The slot 40 is, more particularly, defined by a pair of interior front and back surfaces 42, 44 and an interior end surface 46. The front and back surfaces 42, 44 are spaced from one another along a longitudinal axis A of the rotor R and extend radially relative to the rotor R from the inner periphery 38 of the main seal segment 34 and terminating at outer ends 42a, 44a of the front and back surfaces 42, 44 which are spaced inwardly from the outer periphery 36 of the main seal segment 34. The interior end surface 46 extends along the longitudinal axis A of the rotor R between the outer ends 42a, 44a of the front and back surfaces 42, 44, faces toward the rotor R, and is spaced from the outer and inner peripheries 36, 38 such that the slot 40 at an inner end 40a is open at the inner periphery 38 of main seal segment 34 adjacent to the rotor R.

The annular brush seal 28 is formed of an annular array of a plurality of like arcuate-shaped brush seal segments 48 placed end-to-end and incorporated as a retrofit to or as original equipment in the labyrinth seal 26. One or more teeth T of the labyrinth seal 26 are removed and replaced with the brush seal 28. As seen in FIG. 2, a centrally-located labyrinth seal tooth is removed and the slot 40 is formed in each main seal segment 34 in its place for receiving a respective one of the brush seal segments 48 therein.

More particularly, each brush seal segment 48 is disposed in the slot 40 of one of the main seal segments 34 of the labyrinth seal 26 and includes a layer of bristles 50 and upstream and downstream plates 52, 54. The bristles 50 engage the rotor R about the circumference thereof. The layer of bristles 50 has opposite outer and inner portions 50a, 50b and upstream and downstream sides 50c, 50d. The upstream plate 52 has outer and inner portions 52a, 52b and is disposed adjacent to the upstream side 50c of the layer of bristles 50. The downstream plate 54 has outer and inner portions 54a, 54b and is disposed adjacent to the downstream side 50d of the layer of bristles 50. The outer portion 50a of the layer of bristles 50 is fixedly secured between the outer portions 52a, 54a of the upstream and downstream plates 52, 54, whereas the inner portion 50b of the layer of bristles 50 extend beyond the inner portions 52b, 54b of the upstream and downstream plates 52, 54 toward the rotor R.

The downstream plate 54 also has opposite ends 54c, opposite sides 54d, 54e respectively facing toward and away from the downstream side 50d of the layer of bristles 50, and a cavity 56 recessed in the one opposite side 54d of the downstream plate 54 facing toward the downstream side 50d of the layer of bristles 50. The cavity 56 extends between and is blocked or terminated by the opposite ends 54c of the downstream plate 54.

The means 32 for communicating the balancing pressure from the exterior pressure source $P_S$ to the cavity 56 of the downstream plate 54 and thereby to the downstream side 50d of the layer of bristles 50 includes one or more elongated passages 58 defined through the main seal segment 34 and one or more holes 60 defined through the downstream plate 54. Each elongated passage 58 extends radially relative to the longitudinal axis A of the rotor R and between the outer periphery 36 of the main seal segment 34 and the interior end surface 46 of the slot 40 therein. Each elongated passage 58 also extends between the outer periphery 36 and the back surface 44 of the slot 40 of main seal segment 34. Each hole 60 formed through the downstream plate 54 of the brush seal segment 48 between the opposite sides 54d, 54e of the downstream plate 54 communicates with one of the passages 58 and opens into the cavity 56 in the downstream plate 54. Each hole 60 is formed closer to the outer portion 54a than to the inner portion 54b of the downstream plate 54. The holes 60 are spaced apart with the middle hole 60 located approximately centrally between the opposite ends 54c thereof. High pressure steam is fed through each passage 58 and hole 60 to the cavity 56 in each downstream plate 54 so as to pressurize the cavity 56 and thereby balance the pressure at the downstream side 50d of the layer of bristles 50 with that of the pressure source $P_S$ and at the upstream side 50c of the layer of bristles 50. The opposite ends 54c of the downstream plate 54 block the adjacent ends of the cavity 56 so as to prevent escape of the pressurized steam at the opposite ends 34a of the main seal segment 34.

It is thought that the present invention and its advantages will be understood from the foregoing description and it will be apparent that various changes may be made thereto without departing from the spirit and scope of the invention or sacrificing all of its material advantages, the form hereinbefore described being merely preferred or exemplary embodiment thereof.

What is claimed is:

1. A seal arrangement for a rotary machine comprising:

a main seal segment having an outer periphery, an inner periphery disposed radially inwardly from said outer periphery and a slot defined in said main seal segment between said outer and inner peripheries thereof and being open at said inner periphery and extending toward and terminating in a spaced relationship from said outer periphery;

a brush seal segment disposed in said slot and including a layer of bristles having opposite outer and inner portions and upstream and downstream sides, an upstream plate having outer and inner portions and being disposed at said upstream side of said layer of bristles and a downstream plate having outer and inner portions and being disposed at said downstream side of said layer of bristles, said outer portion of said layer of bristles being secured between said outer portions of said upstream and downstream plates and said inner portion of said layer of bristles extending beyond said inner portions of said upstream and downstream plates, said downstream plate also having opposite ends, opposite sides respectively facing toward and away from said downstream side of said layer of bristles and a cavity recessed in a one of said opposite sides of said downstream plate facing toward said downstream side of said layer of bristles, said cavity extending between and being terminated by said opposite ends of said downstream plate; and means for communicating pressure radially through said main seal segment to said cavity in said downstream plate of said brush seal segment from a source of pressure located exteriorly of said outer periphery of said main seal segment for providing a balance of pressure between the pressure source and said cavity in said downstream plate of said brush seal segment and thereby at said downstream side of said layer of bristles.

2. The arrangement of claim 1 in which said means for communicating pressure includes at least one elongated passage formed radially through said main seal segment between said outer periphery and said slot thereof.

3. The arrangement of claim 2 in which said means for communicating pressure further includes at least one hole formed through said downstream plate of said brush seal segment between said opposite sides of said downstream plate and communicating with said passage and opening into said cavity in said downstream plate.

4. The arrangement of claim 3 in which said at least one hole is formed closer to said outer portion than to said inner portion of said downstream plate.

5. The arrangement of claim 1 in which said main seal segment is a labyrinth seal segment.

6. The arrangement of claim 1 in which said rotary machine is a turbine and in which said main seal segment is arcuate-shaped for placing said main seal segment end-to-end with other like main seal segments for extending about a turbine rotor.

7. The arrangement of claim 6 in which said brush seal segment is arcuate-shaped for placing said brush seal segment end-to-end with other like brush seal segments and to conform to said arcuate-shaped main seal segment.

8. A seal arrangement for a turbine, comprising:

a plurality of labyrinth seal segments for placing end-to-end in a housing extending about a turbine rotor, each of said labyrinth seal segments having an outer periphery facing away from said turbine rotor, an inner periphery spaced radially inwardly from said outer periphery and facing toward said turbine rotor and a slot defined in each of said labyrinth seal segments between said outer and inner peripheries thereof and being open at said inner periphery thereof adjacent to said turbine rotor;

a plurality of brush seal segments for placing end-to-end about said turbine rotor, each of said brush seal segments disposed in said slot of one of each of said labyrinth seal segments and including a layer of bristles having opposite outer and inner labyrinth seal segments and including a layer of bristles having opposite outer and inner portions and upstream and downstream sides, an upstream plate having outer and inner portions and being disposed at said upstream side of said layer of bristles and a downstream plate having outer and inner portions and being disposed at said downstream side of said layer of bristles, said outer portion of said layer of bristles being secured between said outer portions of said upstream and downstream plates and said inner portion of said layer of bristles extending beyond said inner portions of said upstream and downstream plates toward said turbine rotor, said downstream plate also having opposite ends, opposites sides respectively facing toward and away from said downstream side of said layer of bristles and a cavity recessed in a one of said opposite sides of said downstream plate facing toward said downstream side of said layer of bristles, said cavity extending between and being terminated by said opposite ends of said downstream plate; and means for communicating pressure radially through said labyrinth seal segment to said cavity in said downstream plate of said brush seal segment from a source of pressure located exteriorly of said outer periphery of said labyrinth seal segment for providing a balance of pressure between the pressure source and said cavity in said downstream plate of said brush seal segment and thereby at said downstream side of said layer of bristles.

9. The arrangement of claim 8 in which said means for communicating pressure includes at least one elongated passage formed radially through each of said labyrinth seal segments between said outer periphery and said slot thereof.

10. The arrangement of claim 9 in which said means for communicating pressure further includes at least one hole formed through said downstream plate of each of said brush seal segments between said opposite sides of said downstream plate and communicating with said passage and opening into said cavity in said downstream plate.

11. The arrangement of claim 10 in which said at least one hole is formed closer to said outer portion than to said inner portion of said downstream plate.

12. The arrangement of claim 8 in which said slot of each of said labyrinth seal segments is defined by a pair of interior front and back surfaces spaced from one another along an axis of said turbine rotor and extending from said inner periphery and terminating at outer ends spaced from said outer periphery and an interior end surface extending along the axis of and facing toward said turbine rotor and extending between said outer ends of said front and back surfaces and spaced from said inner and outer peripheries such that said slot at an inner end is open at said inner periphery of said labyrinth seal segment adjacent to said turbine rotor.

13. The arrangement of claim 12 in which said means for communicating pressure includes at least one elongated passage formed radially through each of said labyrinth seal segments and extending radially relative to the axis of said turbine rotor and between said outer periphery and said interior end surface of said slot of said labyrinth seal segment.

14. The arrangement of claim 13 in which said at least one elongated passage also extends between said outer periphery and said back surface of said slot of said labyrinth seal segment.

15. The arrangement of claim 13 in which said means for communicating pressure further includes at least one hole formed through said downstream plate of each of said brush seal segments between said opposite sides of said downstream plate and communicating with said passage and opening into said cavity in said downstream plate.

16. The arrangement of claim 15 in which said at least one hole is formed closer to said outer portion than to said inner portion of said downstream plate.

* * * * *